H. JARVIS.

SELF CLOSING TAP.

APPLICATION FILED JUNE 1, 1920.

Reissued Nov. 15, 1921.

15,225.

INVENTOR
HAROLD JARVIS
BY HIS ATTORNEY
William R. McKeat

UNITED STATES PATENT OFFICE.

HAROLD JARVIS, OF TORONTO, ONTARIO, CANADA.

SELF-CLOSING TAP.

15,225. Specification of Reissued Letters Patent. Reissued Nov. 15, 1921.

Original No. 1,314,195, dated August 26, 1919, Serial No. 189,062, filed August 31, 1917. Application for reissue filed June 1, 1920. Serial No. 385,852.

*To all whom it may concern:*

Be it known that I, HAROLD JARVIS, a subject of the King of Great Britain, and resident of the city of Toronto, county of York, Province of Ontario, in the Dominion of Canada, have invented certain new and useful Improvements in Self-Closing Taps, described in the following specification and illustrated in the accompanying drawings, that form part of the same.

The principal object of the invention is to eliminate the undesirable noise and detrimental vibration commonly known as water hammer in a pressure actuated self closing tap.

The principal feature in the invention consists in the novel construction of the valve spindle and the arrangement of the closing valve whereby the passage through which the water flows is gradually cut off by the valve stem in the closing of the valve, the stem being formed with longitudinal grooves to allow of the passage of the water and a solid portion between said grooves and the closing valve.

Pressure closing valves of various forms have been known for a considerable period and it is the main object of this invention to overcome the difficulties met with in the use of such valves. This result has been achieved in the construction shown, in which the interior of the valve body 1 is formed with an annular shoulder 2 having the centrally arranged circular hole 3 and the valve seat 4 on the under face thereof.

Figure 1:
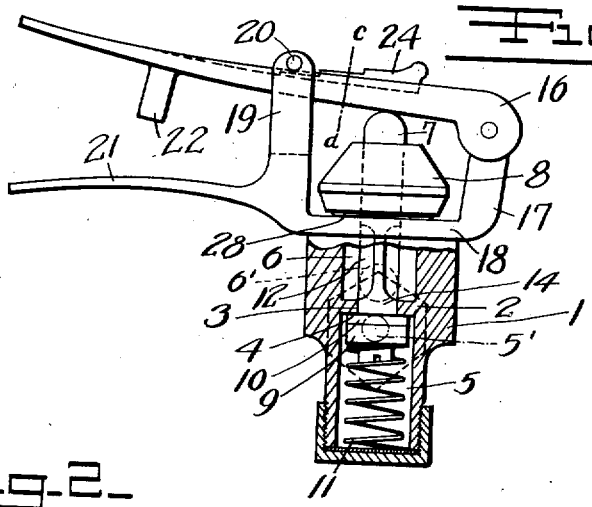
Figure 1 is an elevational part sectional view of a tap constructed in accordance with this invention.
Figure 2:
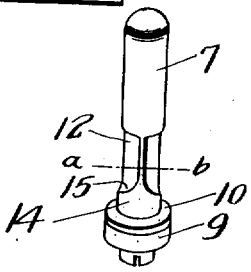
Fig. 2 is a perspective detail of the valve stem.
Figure 3:
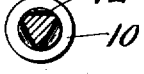
Fig. 3 is a cross sectional view through the line *a—b* of Fig. 2.
Figure 5:
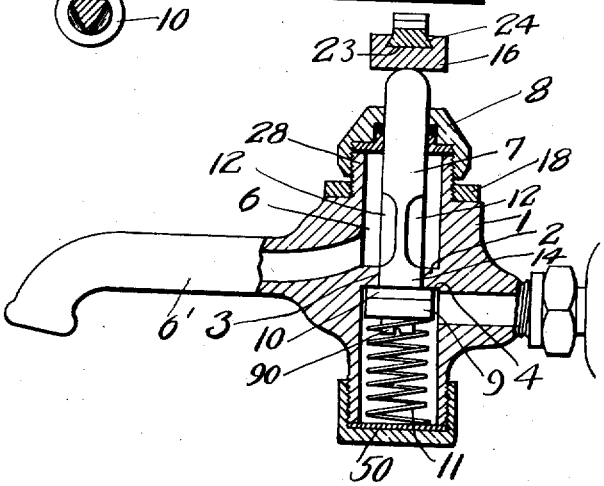
Fig. 5 is a similar view to Fig. 1 and taken at right angles thereto.

The water enters the chamber 5 below the valve seat through the hole $5^1$ indicated in dotted lines and flows upwardly from the hole indicated in dotted lines through the hole 3 and out through a suitable nozzle or faucet (Fig. 5) connected with the chamber 6, the opening through the nozzle being indicated by $6^1$.

The cylindrical valve stem 7 is slidably arranged in the hole 3 and the upper end extends through the packing nut 8 at the top of the valve, the packing nut being screwed on the neck 28 rising from the valve-body 1. The lower end of the valve stem is formed with an enlarged cylindrical portion 9, upon the upper surface of which and surrounding the stem is arranged a flat washer 10, which washer is adapted to abut the valve seat 4. The members 9 and 10 constitute the valve head which effectively closes the passage, the pressure holding it closed. A coil spring 11 is arranged within the chamber 5 to insure the closing of the valve.

The valve stem 7 is grooved as shown preferably at three sides to form a triangular shaped section 12, the lower ends 15 of the grooves being preferably beveled and spaced a substantial distance above the washer 10, so that in closing, the full circular portion 14 will enter the hole 3 and cut off the supply before the full pressure of the water is exerted against the bottom end of the spindle to hold it closed. This arrangement for cutting off the flow eliminates the hammering effect which takes place in the present forms of self closing taps. It is necessary that the washer 10 be flat in order to confine a portion of the water between it and the shoulder 2, for the purpose of cushioning the impact thus eliminating the water hammer. The valve stem 7 is operated to open the valve by means of the lever 16 engaging the top thereof, said lever being pivotally secured to the lug projection 17 of the member 18 secured to the upper part of the valve body 1 by a screw-threaded connection with the neck 28.

The member 18 is preferably provided with an upwardly projecting lug 19 which is slotted vertically to receive the lever 16 that is so as to extend on each side thereof and a pin 20 extends across the top of the slot to secure the lever from being turned over. A fixed arm 21 forms part of the member 18 and the lever 16 is provided with a lug 22 adapted to engage the arm member 21 to limit the downward movement of the lever and prevent it being sprung.

Figure 4:
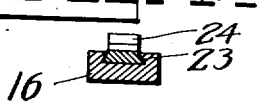
Fig. 4 is a cross sectional view through the line *c—d* of Fig. 1.

The upper face of the lever 16 is formed with a longitudinal slot 23, which is preferably undercut as shown in Fig. 4, and in this slot is arranged a sliding block 24 which block is formed with a plurality of steps. These steps are adapted to engage the pin 20 so as to hold the tap open if it is desired to have the water running for any special purpose. This block arrangement may be dispensed with if desired, without in any way interfering with the operation of the tap.

In the operation of this tap, upon the squeezing of the lever 16 and arm 21 together the lever 16 presses downwardly upon the valve stem 7 and removes the valve washer 10 from its seat. The further downward movement brings the beveled ends 15 of the grooves into communication with the pressure chamber 5 and the water then flows freely through the hole 3 around the stem. This flow continues as long as the lever 16 is held down, but immediately upon its release the pressure of the spring 11 and the pressure of the water against the underside of the valve, moves the valve spindle upwardly. Ordinarily when this action occurs the pressure of the water closes the valve with a snap and a hammer results but by arranging the grooves in the spindle in the manner described the flow is so cut off that the closing action of the spindle is retarded.

A tap constructed as described has been very satisfactorily tested under various pressures and it is found to be absolutely free from noise.

I disclaim the structure suggested in Patent No. 124,082, February 27, 1872 to Thomas Prosser of Brooklyn, New York State, for cocks, to construct a tap with an integral shoulder with a relatively large port, and a valve-head provided with a washer to be seated on the shoulder, and the body of the tap having a chamber with closure through which the valve-head may be introduced; and I also disclaim the structure suggested in Patent No. 1,273,931, July 30, 1918 to John P. Schild to construct a self-closing faucet with an internal plug separately constructed to be entered into the faucet body and fastened rigidly therein, this plug carrying slidably therein a valve stem which is grooved and has an ungrooved portion contiguous to a valve head, the idea being to close a port through the plug by the valve stem before the valve head comes to its seat. Neither of these structures, however, suggest a unitary body having the integral shoulder with a relatively small port closed by a valve stem carrying a valve head adapted to be seated on the shoulder and a stem being also cut away to present a port when the portion of the stem closing the port in the body is displaced from the port as claimed hereinafter.

What I claim as my invention is:

1. A self-closing tap, comprising, a body having a cylindrical vertical bore and a valve seat in the form of a flat flange integral with the body and extending into the bore, a unitary valve stem having a flat head at the bottom end and a washer adapted to engage said seat from the under side, said valve stem being a snug sliding fit in the flange and having a recess in the periphery spaced above the washer, the lower end of the stem being adapted to cut off the flow of water prior to the closing of the washer against the seat.

2. In a self-closing tap, a unitary body having an integral internal annular shoulder presenting a flat valve seat with an opening therethrough, and such body having a chamber communicating with the seat and the chamber having an entrance with closure; a valve stem having a valve head, the entrance through the chamber permitting the passage of the valve head, such valve head presenting a flat annular face to come into flat contact with the face of the shoulder and adapted to close said opening, said stem passing through the opening in the valve seat and having a portion adjacent to the valve head adapted to close said opening sufficiently prior to the seating of the valve head to present water-hammer, said stem having above the last mentioned portion straight grooves parallel to its axis and with their ends toward the valve head gradually diminished in depth.

3. A self closing tap comprising a valve body having a central chamber open at the top and provided with a valve seat arranged between inflow and outflow openings, a valve stem arranged in said chamber and extending thereabove and having a valve at its lower end for closing against the valve seat, a packing nut closing the top of said chamber and encircling said valve stem and a member having a rigid arm extending therefrom and secured to said body and encircling said stem, a lever pivotally supported from said member and extending over and engaging the top of the valve stem and arranged above said arm, means for guiding said lever and means secured thereto intermediate of its length for limiting the movement of the same in one direction.

4. In a self closing valve, a body portion open at the top and having a valve seat, a grooved valve stem extending through said valve seat and having a valve at the inner end adapted to be pressure closed against said seat, a packing nut closing the open top of the body portion, a member secured to the top of said body portion, a lug extending upwardly from said member, a lever pivotally secured to the upper end of said lug and adapted to engage the upper end of said valve stem, a slotted lug projecting upwardly from said member on the side opposite to the lever supporting lug, said slotted lug forming a guide for limiting the movement of said lever, and a rigid arm projecting from said member and arranged below said lever.

5. In a self-closing valve, a pressure closed valve, a lever pivotally supported from the valve body for opening the valve, a slotted lug extending each side of said lever and having a cross bar at the top, and a member slidably arranged on said lever adapted to engage the underside of said cross bar for holding the valve open.

Signed at the city of Montreal this tenth day of May, 1920.

HAROLD JARVIS.